US008713186B2

(12) United States Patent
Chidambaran et al.

(10) Patent No.: US 8,713,186 B2
(45) Date of Patent: Apr. 29, 2014

(54) SERVER-SIDE CONNECTION RESOURCE POOLING

(75) Inventors: Lakshminarayanan Chidambaran, San Jose, CA (US); Srinath Krishnaswamy, Fremont, CA (US); Krishna Mohan Itikarlapalli, Bangalore (IN); Kevin Neel, San Mateo, CA (US); Sreekumar K. Seshadri, Bangalore (IN); Jonathan Giloni, Foster City, CA (US); Scot McKinley, Belmont, CA (US); Ravi Thammaiah, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 820 days.

(21) Appl. No.: 12/047,278

(22) Filed: Mar. 12, 2008

(65) Prior Publication Data

US 2008/0228923 A1 Sep. 18, 2008

Related U.S. Application Data

(60) Provisional application No. 60/906,941, filed on Mar. 13, 2007.

(51) Int. Cl.
*G06F 15/16* (2006.01)

(52) U.S. Cl.
USPC .......................... 709/227; 709/225; 709/237

(58) Field of Classification Search
USPC .......................... 709/225, 227, 237
See application file for complete search history.

(56) References Cited

U.S. PATENT DOCUMENTS

| 5,566,316 | A | 10/1996 | Fechner et al. |
| 5,600,791 | A | 2/1997 | Carlson et al. |
| 6,088,727 | A | 7/2000 | Hosokawa et al. |
| 6,105,067 | A | 8/2000 | Batra |
| 6,192,401 | B1 | 2/2001 | Modiri et al. |

(Continued)

FOREIGN PATENT DOCUMENTS

| JP | 10-187638 | 7/1998 |
| WO | WO 03/048934 | 6/2003 |
| WO | WO 03/048934 A2 | 6/2003 |

OTHER PUBLICATIONS

Japanese Patent Office, "Notice of Grounds of Rejection", Patent application No. 523435-2006, English Translation, mailed Jun. 9, 2009, 2 pages.

(Continued)

*Primary Examiner* — Backhean Tiv
(74) *Attorney, Agent, or Firm* — Hickman Palermo Truong Becker Bingham Wong LLP

(57) ABSTRACT

A server side connection pool provides pooling of server connections. Thus, client side processes do not create groups of dedicated resources. Clients are provided the capability to communicate to a server side connection broker process to GET a pooled server connection comprising connection state plus a thread of execution for doing some work, whereby requesting the work can bypass the connection broker process and go directly to the assigned pooled connection. Once the client issues a RELEASE to release the pooled connection back to the pool, a completely different client process on potentially a different client middle tier machine can reuse the same pooled connection. The server-side connection pool can be logically partitioned into sub-pools that correspond to connection classes that typically correspond to respective applications. A client process can request a pooled connection having a particular state, where a stored procedure can be executed to generate such state.

27 Claims, 5 Drawing Sheets

(56) References Cited

U.S. PATENT DOCUMENTS

| | | |
|---|---|---|
| 6,279,001 B1 | 8/2001 | DeBettencourt et al. |
| 6,310,883 B1 | 10/2001 | Mann et al. |
| 6,338,089 B1* | 1/2002 | Quinlan ............... 709/227 |
| 6,353,898 B1 | 3/2002 | Wipfel et al. |
| 6,389,431 B1 | 5/2002 | Frolund et al. |
| 6,408,282 B1* | 6/2002 | Buist ............... 705/36 R |
| 6,415,333 B1 | 7/2002 | Vasell |
| 6,438,705 B1 | 8/2002 | Chao et al. |
| 6,466,949 B2 | 10/2002 | Yang et al. |
| 6,510,431 B1* | 1/2003 | Eichstaedt et al. ............... 1/1 |
| 6,594,786 B1 | 7/2003 | Connelly et al. |
| 6,615,265 B1 | 9/2003 | Leymann et al. |
| 6,681,327 B1* | 1/2004 | Jardin ............... 713/153 |
| 6,718,394 B2 | 4/2004 | Cain |
| 6,779,034 B1* | 8/2004 | Mundy et al. ............... 709/227 |
| 6,801,949 B1 | 10/2004 | Bruck et al. |
| 6,912,588 B1* | 6/2005 | Jardin et al. ............... 709/238 |
| 6,952,766 B2 | 10/2005 | Dervin et al. |
| 6,978,461 B2* | 12/2005 | Shapiro et al. ............... 719/311 |
| 6,990,606 B2 | 1/2006 | Schroiff et al. |
| 7,054,427 B2* | 5/2006 | Malik ............... 379/207.02 |
| 7,058,717 B2* | 6/2006 | Chao et al. ............... 709/226 |
| 7,082,117 B2 | 7/2006 | Billhartz |
| 7,093,250 B1 | 8/2006 | Rector |
| 7,124,188 B2* | 10/2006 | Mangipudi et al. ............... 709/226 |
| 7,177,823 B2 | 2/2007 | Lam et al. |
| 7,225,237 B1* | 5/2007 | Tenereillo ............... 709/219 |
| 7,263,555 B2* | 8/2007 | Banerjee et al. ............... 709/226 |
| 7,272,688 B1 | 9/2007 | Glasco |
| 7,293,255 B2 | 11/2007 | Kumar |
| 7,296,268 B2 | 11/2007 | Darling et al. |
| 7,299,294 B1 | 11/2007 | Bruck et al. |
| 7,334,039 B1* | 2/2008 | Majkut et al. ............... 709/229 |
| 7,337,226 B2* | 2/2008 | Saha et al. ............... 709/226 |
| 7,346,744 B1 | 3/2008 | Glasco |
| 7,370,223 B2 | 5/2008 | Olmstead et al. |
| 7,392,421 B1 | 6/2008 | Bloomstein et al. |
| 7,395,328 B2* | 7/2008 | Ronneburg et al. ............... 709/223 |
| 7,437,461 B2* | 10/2008 | Sugizaki ............... 709/226 |
| 7,437,473 B2* | 10/2008 | Lu et al. ............... 709/236 |
| 7,447,693 B2 | 11/2008 | Wilding et al. |
| 7,477,648 B2* | 1/2009 | Ota et al. ............... 370/401 |
| 7,500,001 B2 | 3/2009 | Tameshige et al. |
| 7,512,711 B1* | 3/2009 | Abjanic et al. ............... 709/246 |
| 7,583,286 B2* | 9/2009 | Brooksby et al. ............... 348/14.01 |
| 7,675,890 B2* | 3/2010 | Wang ............... 370/338 |
| 7,702,796 B2* | 4/2010 | Shen et al. ............... 709/227 |
| 7,747,717 B2* | 6/2010 | Colrain ............... 709/223 |
| 7,921,213 B1* | 4/2011 | McBreen et al. ............... 709/227 |
| 8,566,445 B2* | 10/2013 | Maynard ............... 709/225 |
| 2002/0055982 A1 | 5/2002 | Goddard |
| 2002/0073354 A1 | 6/2002 | Schroiff et al. |
| 2002/0078263 A1 | 6/2002 | Darling et al. |
| 2002/0099598 A1 | 7/2002 | Eicher et al. |
| 2002/0099831 A1* | 7/2002 | Tsunogai ............... 709/227 |
| 2002/0129146 A1 | 9/2002 | Aronoff et al. |
| 2002/0198883 A1 | 12/2002 | Nishizawa et al. |
| 2003/0050959 A1* | 3/2003 | Faybishenko et al. ............... 709/202 |
| 2003/0081748 A1 | 5/2003 | Lipinski |
| 2003/0088425 A1 | 5/2003 | Lam et al. |
| 2003/0126240 A1 | 7/2003 | Vosseler |
| 2003/0154398 A1 | 8/2003 | Eaton et al. |
| 2003/0158951 A1 | 8/2003 | Primak et al. |
| 2003/0195962 A1* | 10/2003 | Kikuchi et al. ............... 709/226 |
| 2003/0204509 A1 | 10/2003 | Dinker et al. |
| 2004/0019680 A1 | 1/2004 | Chao et al. |
| 2004/0024881 A1 | 2/2004 | Elving et al. |
| 2004/0030801 A1* | 2/2004 | Moran et al. ............... 709/244 |
| 2004/0078455 A1 | 4/2004 | Eide et al. |
| 2004/0088413 A1 | 5/2004 | Bhogi et al. |
| 2004/0092260 A1 | 5/2004 | Thubert et al. |
| 2004/0098490 A1 | 5/2004 | Dinker et al. |
| 2004/0122953 A1* | 6/2004 | Kalmuk et al. ............... 709/227 |
| 2004/0153708 A1 | 8/2004 | Joshi et al. |
| 2004/0221031 A1* | 11/2004 | Desai ............... 709/224 |
| 2005/0038801 A1* | 2/2005 | Colrain et al. ............... 707/100 |
| 2005/0038890 A1* | 2/2005 | Masuda et al. ............... 709/224 |
| 2005/0188091 A1 | 8/2005 | Szabo et al. |
| 2005/0262183 A1* | 11/2005 | Colrain et al. ............... 709/200 |
| 2005/0289244 A1* | 12/2005 | Sahu et al. ............... 709/249 |
| 2006/0031536 A1* | 2/2006 | Eydelman et al. ............... 709/228 |
| 2006/0080388 A1* | 4/2006 | Cherkasova et al. ............... 709/203 |
| 2006/0089880 A1* | 4/2006 | Merriman et al. ............... 705/14 |
| 2006/0146877 A1* | 7/2006 | Srivastava ............... 370/469 |
| 2006/0195525 A1 | 8/2006 | Page et al. |
| 2007/0156869 A1* | 7/2007 | Galchev et al. ............... 709/223 |
| 2007/0198684 A1* | 8/2007 | Mizushima ............... 709/223 |
| 2007/0250779 A1* | 10/2007 | Wallach et al. ............... 715/740 |
| 2008/0114895 A1* | 5/2008 | Chun ............... 709/238 |
| 2008/0228923 A1* | 9/2008 | Chidambaran et al. ............... 709/227 |
| 2009/0286513 A1* | 11/2009 | Wilson et al. ............... 455/411 |

OTHER PUBLICATIONS

U.S. Appl. No. 10/917,663, filed Aug. 12, 2004, Office Action, Nov. 12, 2010.

* cited by examiner

```
┌─────────────────────────────────────────────────┐
│ RECEIVE, AT A SERVER AND FROM A FIRST CLIENT PROCESS │
│ ASSOCIATED WITH A FIRST MACHINE, A FIRST REQUEST FOR │
│           A CONNECTION TO A SERVER              │
│                      202                        │
└─────────────────────────────────────────────────┘
                        │
                        ▼
┌─────────────────────────────────────────────────┐
│ IN RESPONSE TO THE FIRST REQUEST, THE SERVER SELECTS │
│    A SERVER CONNECTION FROM A POOL OF SERVER    │
│   CONNECTIONS, WHEREIN THE SERVER CONNECTION    │
│  COMPRISES A THREAD OF EXECUTION AND A CONNECTION │
│                  TO THE SERVER                  │
│                      204                        │
└─────────────────────────────────────────────────┘
                        │
                        ▼
┌─────────────────────────────────────────────────┐
│  ASSOCIATE THE CONNECTION RESOURCE WITH THE FIRST │
│                  CLIENT PROCESS                 │
│                      206                        │
└─────────────────────────────────────────────────┘
                        │
                        ▼
┌─────────────────────────────────────────────────┐
│  AFTER THE FIRST CLIENT PROCESS RELEASES THE SERVER │
│  CONNECTION BACK TO THE POOL, RECEIVE AT THE SERVER │
│    FROM A SECOND CLIENT PROCESS ASSOCIATED WITH A │
│  SECOND MACHINE, A SECOND REQUEST FOR A CONNECTION │
│                  TO THE SERVER                  │
│                      208                        │
└─────────────────────────────────────────────────┘
                        │
                        ▼
┌─────────────────────────────────────────────────┐
│  IN RESPONSE TO THE SECOND REQUEST, ASSOCIATE THE │
│ SERVER CONNECTION WITH THE SECOND CLIENT PROCESS │
│                      210                        │
└─────────────────────────────────────────────────┘
```

*FIG. 2*

SERVER-SIDE CONNECTION RESOURCE POOLING

CLAIM OF PRIORITY

This application claims benefit of priority to U.S. Provisional Patent Application No. 60/906,941, entitled Server Side Resource Pooling, filed Mar. 13, 2007, by Lakshminarayanan Chidambaran, et al., the entire contents of each of which are hereby incorporated by reference as if fully set forth herein.

FIELD OF THE INVENTION

The present invention relates generally to data management and, more specifically, to techniques for server-side connection resource pooling.

BACKGROUND

A multi-tier system typically comprises one or more clients that are communicatively coupled to a server. Generally, a server is a combination of integrated software components and an allocation of computational resources, such as memory and processes for executing the integrated software components on a processor, where the combination of the software and computational resources are dedicated to providing a particular type of function on behalf of clients of the server. An example of server is a database server, which among other functions, manages and governs access to a database.

In order for a client to interact with a server, a server connection is established for the client. Through a server connection, the client can issue a series of requests to the server e.g. requests for data, such as queries.

For certain kinds of servers, server connections can be expensive to create and tear down. To take an example, a database server connection is a heavyweight resource that often is associated with a corresponding state (e.g., for authentication, SQL statements, etc.) on the database, and often comprises a dedicated process/thread of execution on the server side. Creating such a database server connection involves establishing a network transport connection from the client to the server machine, often spawning an operating system process/thread of execution, doing multiple roundtrips for authentication, and allocating some state associated with the connection. Tearing down such a connection involves disposing of the network transport connection and the associated state and the process/thread of execution. Thus, a server connection can be expensive to create and tear down. With a dedicated server model, a thread of execution and server connection state resources are dedicated to each server connection, and thus there is no sharing or persistence, and the thread of execution and the server connection state are recreated from scratch for each connection.

A "middle tier" generally refers to the processing that takes place in an application server that sits between the user's machine and a server such as a database server. The middle tier server performs the business logic. Some middle tiers implement server connection pooling so that multiple middle tier threads can share already opened connections and serially reuse them without having to create and tear down one for each web request, for example.

The foregoing scheme works when middle tiers are multi threaded. However, there are common scenarios in which middle tiers use single threaded processes. For example, PHP (Hypertext Preprocessor) is a very popular scripting language that is used in almost a third of the web domains, and PHP applications typically run in single threaded web server environments and often must access database servers to read and store data. There are also common scenarios in which a very large number of middle tier systems are implemented, with each middle tier system having small pools to the database. However, there is no way to share server connections across the pools, i.e., across the middle tier systems. In both of these scenarios, each process holds private resources associated with the database server that are not serially reusable by other processes and, therefore, are often idle. Hence, pooling from the middle tier does not work at all or does not work effectively enough.

Also note that the same scenario with reference to single threaded mid-tier systems is also possible in traditional client server systems where a large number of separate client processes hold onto server connections but need to use them relatively infrequently. In such cases also, pooling of such connections is desired but not possible without additional support. The present detailed description may refer to a mid-tier process operating on a server connection, but it should be understood as not being limited to processes belonging to middle tier application servers but also subsuming client-server systems as well.

One workaround may involve tearing down and recreating server connections, which is not a very viable alternative due to the significant overhead and resource usage involved, for example, in spawning a new thread of execution and recreating server connection state.

Another workaround could involve using a connection proxy to pool server connections among middle tier machines, through which all client processes interact with the back-end server for both requesting server connections as well as requesting server operations. Not only does such a middle tier architecture force an extra hop in all communications between the clients and the servers, i.e., through the proxy, but also often requires applications to be recoded to use the connection proxy's API (Application Programming Interface) rather than some standard API. Examples of such connection proxies include products such as SQL-Relay, that are used in PHP environments to alleviate some of the lack of server connection pooling.

Another workaround may involve the use of shared threads/processes on the server where the threads of execution can be shared amongst different server connections, but each server connection still has its distinct state in some shared memory accessible by all the threads. Moreover, in such a model, the dispatching process is always involved in the communications. Examples of such technologies include the Oracle Shared Server Database configuration with Oracle 11g.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flow diagram that illustrates a method for managing connections to a server, according to an embodiment of the invention;

DETAILED DESCRIPTION OF EMBODIMENTS OF THE INVENTION

Figure 1A:
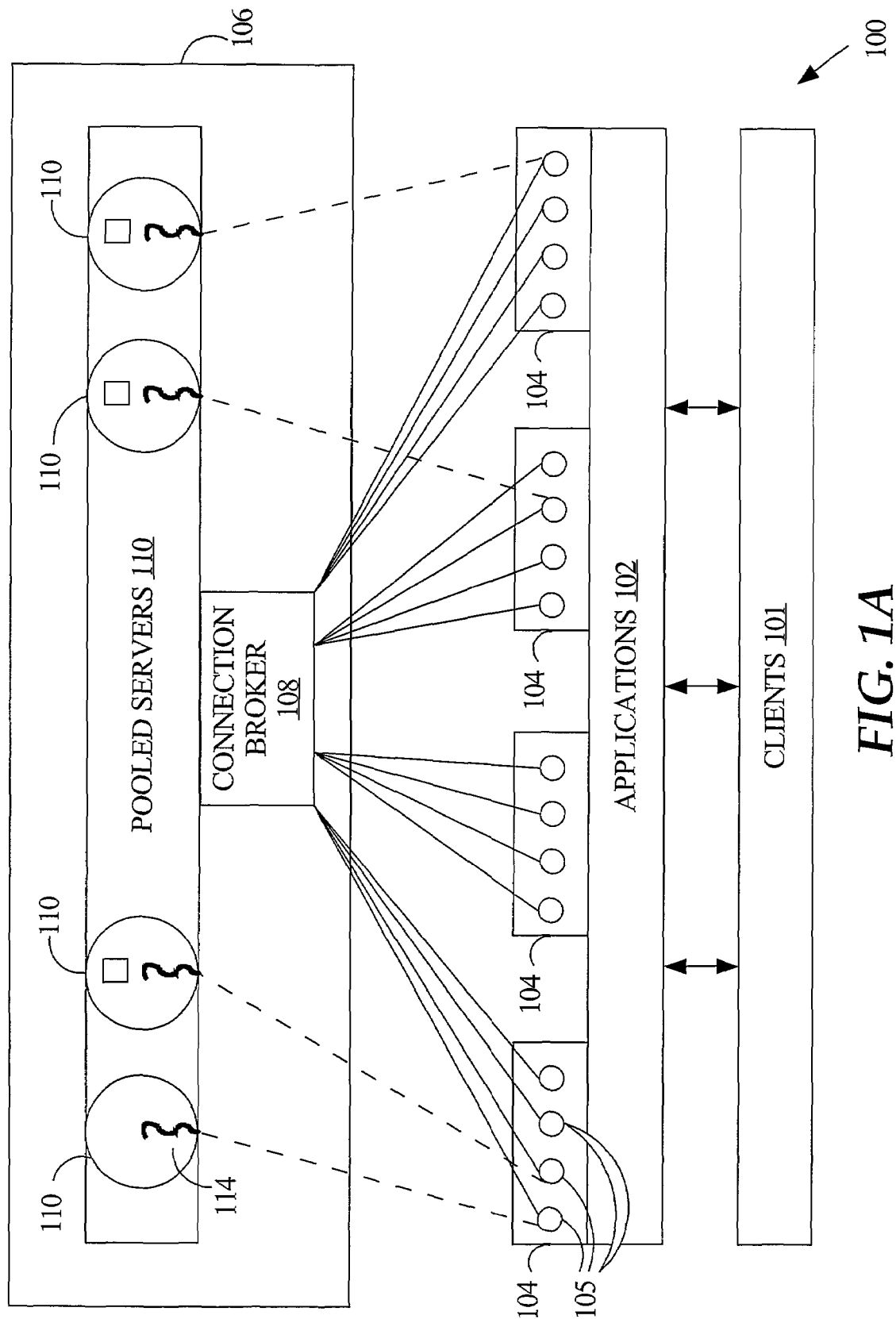
FIGS. 1A and 1B are block diagrams illustrating an example operating environment in which an embodiment of the invention may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview of Embodiments

A server side connection pool is described, where server connections (and resources thereof) are pooled and managed by a connection broker. Thus, client side processes do not create islands of dedicated server connections. Rather, clients simply connect to a connection broker and do not hold on to server connections when idle. When the clients need to do operations on the server, they have the ability to communicate to the server side connection broker process to GET a server connection (e.g., server connection state plus a thread of execution) on demand for doing some work, following which the work requests can bypass the connection broker process. When a client side process needs a server connection the client process issues a GET request to the server, which assigns a temporarily dedicated server connection from the pool to the client. The client then requests performance of the required work on the temporarily dedicated server connection directly and then issues a RELEASE to release the server connection back to the pool. At this point, a completely different client process on potentially a different client middle tier machine can reuse the same pooled server connection.

The connection broker may run on the same machine as the server. It may also run on a different machine which may or may not be the same machine as the middle-tier. In either case, the client application need not be aware of where the connection broker runs and interacts with the connection broker with the same set of APIs to GET and RELEASE connections. In one embodiment, the client side APIs to access the server are transparently modified to interact with the connection broker and hence no changes are required to application code on the client to run against a system where the connection broker manages a pool of server connections.

The server-side connection pool can be logically partitioned into sub-pools that correspond to connection classes that typically correspond to respective applications. This ensures that clients belonging to different applications do not inadvertently share pooled server connections which might be associated with application specific connection state. This however allows for multiple client processes associated with a particular application, even across machines running one or more instances of the application, to specify their corresponding connection class in server connection GET requests in order to obtain a server connection with a desired state. Furthermore, a client process can request a server connection having a particular state, where a stored procedure can be executed to generate such state.

Optimizations include preserving the network transport connection from the client to the connection broker even after a RELEASE has been issued by the client. Creating the network transport connection from scratch and re-authenticating the client is an expensive operation. By preserving the network transport connection, and by maintaining state on the broker associated with the network transport connection, known as the network connection state, the broker can remember the fact that a client has been authenticated once. Thus subsequent GET requests from the client need not present the credentials required for authenticating the client all over again. Also, the process of authentication need not be carried out again because the client's credentials would have been verified the very first time a GET was issued by such a client. This enables clients that need to issue frequent work requests to the server to stay connected to the connection broker for an extended period of time and allows them to get a pooled server connection on demand without incurring the additional overheads described previously on every occasion. The resources associated with the network connection state (typically a small amount of memory, for example) are quite minimal and can be easily assigned to each incoming network transport connection.

An optimization includes piggybacking the GET request on the real work request from the client. In this manner, the client need not perform an explicit round-trip just to issue a GET message to the broker.

A further optimization can leverage a certain common mode of operation in which a client issues multiple GET requests. GET requests originating from a certain network transport connection (from a certain client) are associated by the network connection state with a fixed connection class provided during the first GET request on that transport connection. The connection class usually corresponds to a certain application and clients repeatedly process requests for that fixed application for their lifetime. Hence, all network transport connections opened to the broker from such clients carry GET requests for the same connection class. Moreover, even if the client indeed does have a need to deal with multiple connection classes, it can always be required to open a new transport connection to the broker for each new connection class, thereby still maintaining the one-to-one mapping from a given transport network connection to connection class. In such an environment, after the first GET request, the broker can cache the supplied connection class in the network connection state associated with the network transport connection to the broker. Thereafter, following a RELEASE, the next call doing real work is assumed to imply a GET request so that the extra roundtrip or even an extra explicit message for the GET is avoided altogether and the client is assigned a pooled server connection based on the cached connection class in the network connection state associated with the network transport connection to the broker. In another embodiment, a RELEASE can be piggybacked on the last call from the client. In yet another embodiment, a RELEASE can be converted into a one way RPC so that the client side does not have to wait for the RELEASE action to be completed on the server, and acknowledged, before the client moves ahead.

In order to achieve the client's direct conversation with the pooled server connection thread for doing actual server operations, in one embodiment, the network transport connection associated at the connection broker is handed-off to the pooled server connection's thread of execution. Such a hand-off may require operating system support if the connection broker and the server connection thread reside in separate processes involving a separation of address spaces. On the other hand, if they reside in the same address space, the handoff of the network descriptor may require no special operating system support. In this manner, the connection broker is not involved in subsequent conversations between the client and the pooled server connection thread. At this point, the network transport connection descriptor is owned by the pooled server connection thread but may also exist at both the connection broker. However, as long as the network transport connection is given to the pooled server connection, the connection broker removes the corresponding descriptor from the list of network transport connection descriptors that it listens to for GET requests. Thus, all subsequent requests are only handled by the pooled server connection's thread of execution.

In another embodiment, when the pooled server connection thread receives a RELEASE message from the client, it hands-back the network transport descriptor to the connection broker, at which point, the connection broker adds the descriptor back to the list of descriptors that it listens on for GET requests. If the connection broker and the pooled server connection thread reside in separate processes with a separation of address spaces, such a hand-back can be physically carried out using operating system support. In such a case, in one embodiment where the broker continues to retain the network transport descriptor after handoff, this hand-back can be optimized such that the hand-back can be made virtual wherein the pooled server thread of execution supplies the connection broker with some identifier; this identifier uniquely determining the network transport connection descriptor, which then can be simply added by the broker to the list of descriptors to which it listens for GET requests.

Even though in the illustration above, the handing off and handing back of the network descriptor was described in the context of the connection broker and server connection pool being co-located on the same server machine, it is worthwhile noting that it is possible to achieve the direct conversation between the client process and the server connection thread even otherwise. In another embodiment when the connection broker runs on the same machine as the mid-tier, there could be a handoff from the connection broker to the client process directly. And when the client process does a RELEASE, it could perform a handback to the connection broker. In yet another embodiment when the connection broker runs on a separate machine altogether, the client connection GET request can involve a network level 'redirect' to an appropriate pooled server connection thread. Similarly, a RELEASE would involve a 'redirect' back from the pooled server connection back to the connection broker. This may involve extra communications. Thus, it is important to note that the direct conversation between the client process and the pooled server connection can be instrumented by the broker regardless of where it runs.

Other embodiments include performing a lazy RELEASE in environments wherein the number of pooled server connections is higher than the number of client connections or where the contention for pooled server connections is low. In such cases, the connection broker can defer the actual RELEASE and keep the client bound to a certain pooled server connection in the expectation that the same client will request a similar pooled server connection again. In such cases, the client experiences a superior level of performance because it eliminates the GET/RELEASE handshake altogether. In the eventuality that the pooled server connection bound to a client gets reassigned, the client is notified of the change as a response on the first implicit or explicit GET request. This special response can then be used by the client to destroy certain cached state that may have had some tight coupling with the earlier pooled server that it was bound to.

However, if such a reassignment does not occur, especially when there is low contention, the client can enjoy the benefits of the cached state across multiple explicit/implicit GET requests as if it had its own dedicated server connection. This requires that the very first request (which serves as an implicit GET request) from the client not have any dependence on the cached state whose validity is questionable at that point. Following the first request, if the client does not receive a reassignment notification, the cached state is assumed to be valid and the client and server can reuse such cached state for all subsequent requests.

Example Operating Environment

FIG. 1A is a block diagram illustrating an example operating environment 100 in which an embodiment of the invention may be implemented. Operating environment 100 comprises clients 101 using applications 102 that execute on one or more of multiple mid-tier machines 104, which are each communicatively coupled to a server 106 running on a computer system. Server 106 is associated with a connection broker 108, which manages at least one pool of pooled server connections 110.

Client-Side

Applications 102 represent any computer software application or module that operates in conjunction with server 106. For non-limiting examples, applications 102 may be online commerce applications running on an application server on multiple mid-tier machines 104, and/or web servers running on multiple mid-tier machines 104, providing services to clients 101. Applications at times need access to a server 106, such as a database server, in order to serve the requests of one or more clients 101. Applications 102 typically execute on at least one of the mid-tier machines 104, and multiple instances of a given application 102 may execute on multiple mid-tier machines 104. In this example operating environment, applications 102 utilize mid-tier 104 resources, such as use of processes 105 and/or threads of execution provided by one or more mid-tier machines 104. When applications 102 need access to the functionality of server 106, the applications 102 need a connection to server 106 to enable a server connection with server 106. Hence, applications 102 are capable of submitting one or more requests for a connection to server 106 via a process 105 running on a mid-tier machine 104 where, in response to a connection request, process 105 communicates with connection broker 108. The number of applications 102 running on mid-tier machines 104 and communicatively coupled to server 106 may vary from implementation to implementation.

Middle Tier

Multiple mid-tier machines 104 (or "middle tier machines") are depicted in FIG. 1A, however, the number of mid-tier machines 104 may vary from implementation to implementation. Thus, some embodiments described herein may be applicable to configurations having a single mid-tier machine 104, some embodiments may be applicable to configurations having multiple mid-tier machines 104, and some embodiments may be applicable to either configurations having a single mid-tier machine 104 or multiple mid-tier machines 104, where the context in which each embodiment is described provides an indication of which types of configurations may apply. Each mid-tier machine 104 hosts one or more computer program applications and/or servers (generally, "applications") for servicing client 101 requests.

Each mid-tier machine 104 typically operates by running multiple concurrent processes 105 to perform work for or associated with applications 102. The number of processes 105 running on mid-tier machines 104, and the number of threads of execution associated with each process 105 may vary from implementation to implementation. For example, the mid-tier machines may run applications using single threaded processes 105 or may run applications using multi-threaded processes 105. Recall that a challenge is associated with scenarios in which mid-tier machines 104 use single threaded processes or in embodiments where in spite of middle tier processes being multi-threaded, the number of middle tier systems is very large and, therefore, certain embodiments are especially beneficial to such a mid-tier configuration.

Server-Side

Generally, in response to a connection request from an application 102, e.g., via a mid-tier API, a process 105 running on a mid-tier machine 104 passes the connection request, or reconstructs the connection request for transmission to, the connection broker 108 of server 106. Similarly, with multi-threaded mid-tier processes, in response to a connection request from an application 102, a thread of execution associated with a process 105 passes the connection request, or reconstructs the connection request for transmission to, the connection broker 108. Connections from processes 105 and/or threads (generally, "processes") running on mid-tier machine 104 to connection broker 108 are generally depicted in FIG. 1A as the solid lines connecting the processes 105 to the connection broker 108.

Once the connection broker 108 assigns a pooled server connection to a process 105, further interactions between the process 105 and the pooled server connection 110 are direct, in that these interactions are not via the connection broker 108. Hence, there is no extra hop in communicating with the pooled server connection 110 when in a steady state, e.g., after a pooled server connection is assigned and the process 105 is requesting server operations. Requests and other communications other than connection requests, from processes 105 running on mid-tier machine 104 to the pooled server connection 110, are generally depicted in FIG. 1A as the dashed lines connecting the processes 105 to a respective "pooled server connection 110.

As already mentioned, a server is generally a combination of integrated software components and an allocation of computational resources, such as memory and processes for executing the integrated software components on a processor, where the combination of the software and computational resources are dedicated to providing a particular type of function on behalf of clients of the server. For example, server 106 performs work on behalf of applications 102, generally for clients 101. Thus, server 106 may be any server-based software that performs any type of work on behalf of clients 101 in conjunction with some computational resources.

According to an embodiment, the server 106 of operating environment 100 is a database server. However, certain embodiments of the invention are not limited to use with a database server. As mentioned, a database system typically comprises one or more clients that are communicatively coupled to a database server that is connected to a database, where the clients of the database server may be applications 102 as well as client end-users. A database server is a combination of integrated software components and an allocation of computational resources, such as memory and processes for executing the integrated software components on a processor, for providing a particular type of function on behalf of clients of the database server. A database server governs and facilitates access to a database, processing requests by applications 102 to access the database through respective database server connections. Through database server connections, the applications 102 can issue a series of requests (e.g., requests for operations on data and/or metadata) to the database server. For example, clients of a database server interact with a database server by submitting commands that cause the database server to perform operations on data stored in a database. A database command that is sent from a database client to a database server contains an original statement of the database command, where such statements and commands are also referred to generally herein as "requests". For the database server to process the commands, the commands must conform to a database language supported by the database server, such as the Structured Query Language (SQL).

Figure 1B:
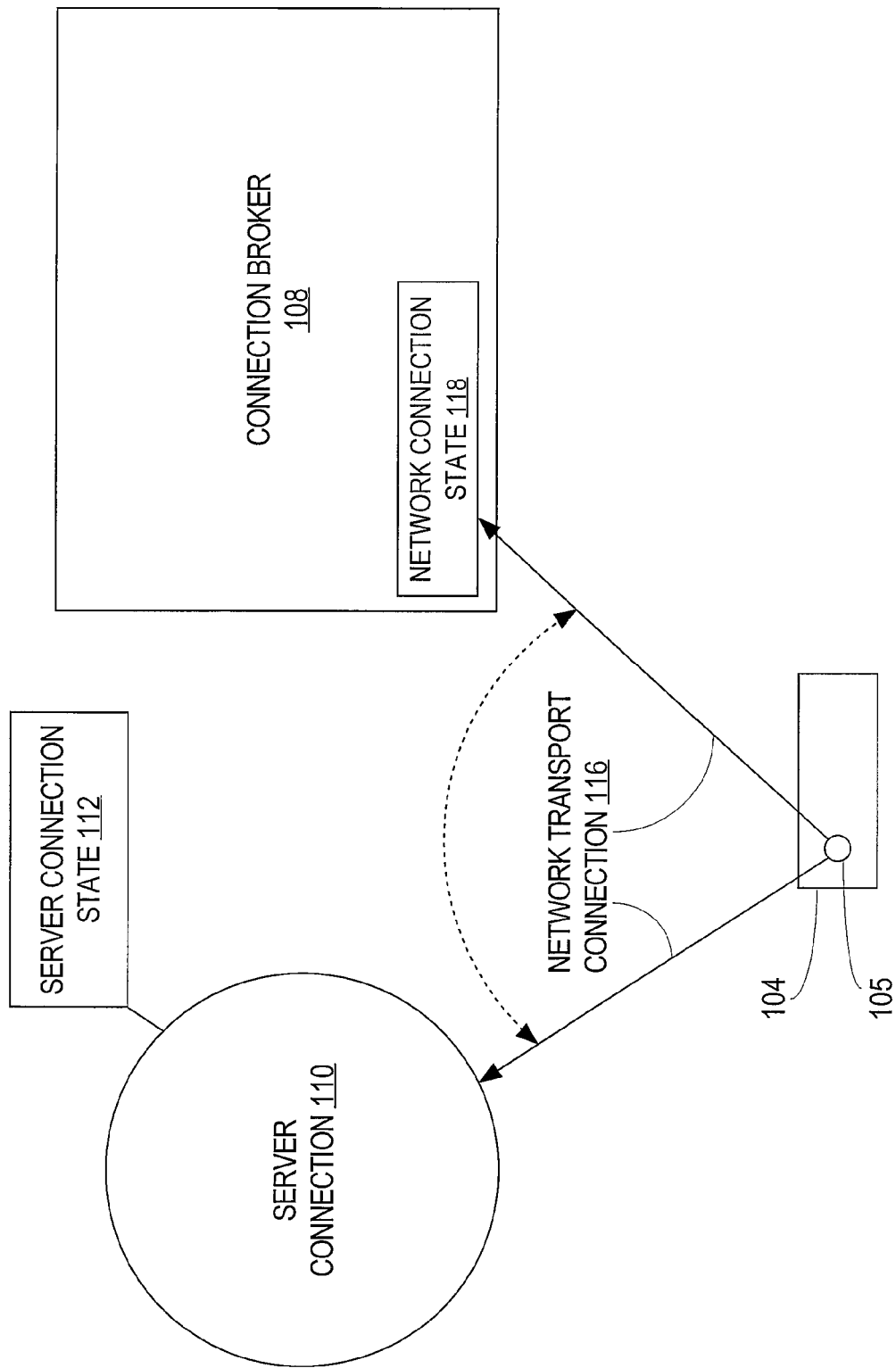

FIG. 1B shows network connections and state structures created for a particular server connection 110. Referring to 1B, connection broker 108 comprises a server-based component, module, process or a set of processes through which connections to server 106 are managed. More than one connection broker process may be required to overcome operating system limitations on the number of network connections that may be associated with a single process. Further, for a server executing on a multiprocessor system, multiple processes of connection broker 108 may be executed on separate processors, thereby achieving concurrent processing and better performance.

Connection broker 108 receives connection requests from a process 105 of a mid-tier machine 104. Connection broker 108 processes connection requests and manages a pool of server connections, referred to herein as pooled server connections 110. The manner in which connection broker 108 processes server connection requests and manages pooled server connections, is described in greater detail herein. In response to this request, a network transport connection 116 is established between the connection broker 108 and the client process 105. As described herein, the network transport connection 116 may be handed-off from the connection broker 108 to the pooled server connection 110 and vice versa. Thus, the endpoint of network transport connection 116 may switch between connection broker 108 and server connection 110. Connection broker 108 maintains information about the network transport connection 116 within network connection state 118. This network connection state includes information such as the connection class and also whether client process 105 has already been authenticated.

Referring to FIG. 1A, pooled server connections 110 represent a unit of resource assigned to active mid-tier processes 105 on demand, that are clients to server 106. Each pooled server connection 110 comprises (a) a server connection state data structure with which server connection state is maintained at the server 106, referred to herein as a server connection state 112 (see FIG. 1B), and (b) a thread of execution, referred to herein as a thread 114. In response to a server connection request from a mid-tier process 105, connection broker 108 assigns to the requesting process a pooled server connection 110. Because the pooled server connections 110 are managed at server 106, server connection pooling is achieved among multiple mid-tier machines 104 and also with single-threaded processes 105. Furthermore, applications 102 communicate via the same client mid-tier APIs that these applications 102 would otherwise use, with the API driver layer being changed to interact with the connection broker 108, rather than with a mid-tier connection pool manager as with some other approaches.

In the context of a database server, an unpooled server connection generally comprises (a) a network transport connection to the database server machine (e.g., a TCP/IP operating system connection); (b) server connection state in dedicated or shared memory (e.g., SQL cache, Java object cache, buffer cache, etc.); (c) a database security context associated with the corresponding server connection (e.g., under which database user the connection resource will function); (d) if a dedicated server configuration, then a dedicated thread of execution for the server connection. The server connection state is bound to the corresponding server connection and may comprise, for example, authentication context, SQL statements, environmental variables (e.g., what language is the client using), global variables, references to a procedural package (e.g., a PL/SQL package), and the like.

In the absence of a server connection pool, when a server connection resource is "closed", the corresponding server connection state is deleted, any dedicated thread of execution is terminated and the network transport connection from the client is closed. On the other hand, when a pooled server connection is released by a process 105, not only is the actual authenticated network transport connection to the connection broker 108 maintained if not otherwise instructed, the server connection state is often maintained if not otherwise instructed and the pooled server connection along with the retained server connection state is returned to the server connection pool. For example, when a pooled server connection 110 is released by a process 105, the corresponding thread 114 places itself back into the connection pool and requests the connection broker 108 to continue listening for more requests on the corresponding authenticated network transport connection.

The pool of server connections 110 is able to be administered on the server-side, for example, by a system administrator setting the minimum size, the maximum size, and the server connection timeout values for the pool and any sub-pools. The timeout setting itself can be an inactivity timeout, for which if a pooled server connection 110 stays inactive and unassigned, the pooled server connection 110 is destroyed. There can be an additional timeout setting called as the maximum think time, which is the maximum time for which a process 105 can hold onto a pooled server connection 110, after an implicit/explicit GET, without doing any useful work on it. If the think time expires, the pooled server connection 110 is reclaimed and may or may not be returned to the pool. The middle tier process 105 will receive an error on subsequent use in the eventuality that the max think time expired. This allows the administrator of the server connection pool, which is a shared resource, to guard the pool from runaway processes 105 that may hang or become unresponsive after obtaining a server connection 110 from the server connection pool. Thus, the pool size may start at the minimum size and, as the load increases, automatically increase in size up to the maximum size. Once the maximum size is reached and all pooled server connections are assigned, then further connection requests would have to wait for a pooled server connection 110 to be released and therefore become available for use by another process 105. Also, in periods of inactivity, if pooled server connections 110 are left unused, their inactivity time expires and they get reclaimed and the server connection pool shrinks in size until it hits the minimum number of connections, beyond which point, it does not shrink anymore. In this manner, in a limited resource system, the server connections are effectively throttled within the parameters set by the administrator.

According to an embodiment, the connection broker 108 manages a single pool of server connections 110. Alternatively, according to an embodiment, the capability is provided for an administrator to "name" pools of server connections 110, for example, to dedicate a pool to a high priority application. A pool of server connections 110 may serve multiple applications 102.

Connection Classes

According to an embodiment, the pool of server connections 110 is logically partitioned, e.g., per application, into sub-pools of server connections 110. Each sub-pool of server connections 110 could be administered and tuned similarly to the pool of server connections 110, e.g., by a system administrator setting the minimum size, the maximum size, and the server connection timeout values for the each sub-pool. Each sub-pool could be used to serve only a corresponding application rather than multiple applications. Therefore, according to one embodiment, connection classes are used to identify a certain class of pooled server connections. According to an embodiment, a connection class is associated with the network transport connection (e.g., a TCP operating system connection) in a data structure maintained by the connection broker 108, known as the network connection state, for as long as the authenticated network transport connection is maintained between a mid-tier machine 104 and the server 106 for the connection class.

When a connection class is specified in a server connection request, the connection class implicitly identifies a corresponding sub-pool of server connections 110, from which server connections associated with that connection class are assigned. For example, a certain connection class may correspond to a sub-pool of server connections 110 for a certain application from applications 102, and all instances of the application running on any number of mid-tier machines 104. It is noteworthy that sharing of server connections 110 associated with a given connection class could include sharing of server connections 110 across mid-tier machines 104.

Client processes 105 working on behalf of stateless applications, i.e., applications that do not depend on server connection state belonging to a particular server connection as long as they have been operated on only by that application itself can share a connection class sub-pool of server connections 110. Furthermore, server connections 110 from a sub-pool could be aged out (e.g., using an LRU, least recently used, process) so that some server connections from that sub-pool could be used by another sub-pool and, therefore, by another connection class.

According to an embodiment, if a server connection request indicates that a "new" (i.e., a connection without any pre-existing server connection state) connection is requested and there are no "new" server connections available in the pool of server connections 110, then the connection broker 108 can destroy the server connection state 112 associated with a particular server connection 110 and recreate a new initialization server connection state 112, as such state is maintained within the corresponding server connection state data structure of the particular pooled server connection 110. In such a scenario, even though the server connection state 112 of the particular pooled server connection 110 is destroyed and recreated, the particular pooled server connection 110 could still comprise the same thread 114 from the particular pooled server connection's previous manifestation. This "new" server connection is assigned to the requesting process 105 as if the server connection is entirely created from scratch, even though the server connection is pooled and has been used previously.

An application 102 may provide application code (e.g., a PL/SQL stored procedure) for resetting a server connection state 112 to a particular state, including an initialization state. For example, a developer of an application 102 may have a better understanding of how its use of server connections affects the server connection state 112 and, therefore, the application 102 is in a better position to reset the server connection state 112 from its 'dirtied' state to a desired state in a computationally efficient manner. In such a scenario in which server connection state 112 reset code is provided by a source external to the server 106, the pooled server connection thread 114 of server 106 could execute the stored procedure on behalf of the application 102, such as in response to a server connection request that identifies explicitly or implicitly the procedure and/or a particular desired server connection state.

An application 102 may "tag" a server connection state 112 prior to a process 105 placing the corresponding server connection 110 back into the pool of server connections 110, where the tag association indicates the "type" of state embodied in server connection state 112. For example, if an application 102 has been servicing client requests in the German language via a particular server connection 110, the application 102 associates with the server connection state 112 of the particular server connection 110 an indication that the environmental context of that particular server connection 110 includes the German language context. A subsequent GET request can ask for a pooled server connection with a particular 'tag'. The 'tag' could also be tracked in the network connection state 118 maintained at the connection broker 108.

Caching the Network Transport Connection

The mid-tier process 105 typically needs to issue multiple units of GET, do server work and RELEASE requests. Re-establishing and tearing down the network connection for each GET/RELEASE request can be very expensive. In one embodiment, the network transport connection from the mid-tier process 105 to the connection broker 108 is kept open even after a RELEASE has been issued by the process 105. Creating the network transport connection from scratch and re-authenticating the mid-tier process 105 is an expensive operation for the connection broker 108 to perform. By keeping the network transport connection cached, and by associating state on the connection broker 108 associated with the network transport connection, known as the network connection state, the connection broker 108 can remember the fact that a mid-tier process 105 has been authenticated once. Thus subsequent GET requests from the mid-tier process 105 need not present the credentials required for authenticating the mid-tier process 105 all over again. Also, the process of authentication need not be carried out again because the credentials presented by the mid-tier process 105 would have been verified the very first time a GET was issued by such a mid-tier process 105. This enables the mid-tier processes 105 that need to issue frequent work requests to the server 106 to stay connected to the connection broker 108 for an extended period of time and allows them to get a pooled server connection 110 on demand. The resources associated with the network connection state are quite minimal and can be easily assigned to each incoming network transport connection at the connection broker 108.

Implicit Get

With a connection broker 108 controlling and managing the server connections, i.e., the pooled server connection 110, an "extra" round-trip communication between each application 102/mid-tier machine 104 and the server 106 may result (e.g., embodied, generally, by the server connection request to the server). This extra round-trip could affect system performance. This extra roundtrip can be eliminated by two techniques known as "piggybacked GET" and "implicit GET".

According to the piggybacked GET technique, the GET message is piggybacked with the message for the first work request to the server from the client. In this manner, a separate round-trip for the GET is avoided.

According to another embodiment, an "implicit GET" technique is utilized in some scenarios in order to minimize the round-trip communications between the mid-tier and server 106 and to minimize processing at server 106.

According to the piggybacked GET technique, when a message to perform work on the server from a process 105 associated with a particular application 102 is sent to the server 106, a server connection GET command is appended and the connection broker 108 responds accordingly by assigning a pooled server connection 110 to the process 105. Thus, the process 105 does not need to send a first message to request a server connection and a second message to request a service. Rather, a single message serves both purposes, explicitly requesting a server connection in the same message that is requesting the service.

Furthermore, according to the implicit-GET technique, after a process 105 associated with a particular application releases a pooled server connection 110 back to the pool, the first time that any process 105 associated with the particular application 102 communicates with the server 106 on the same network transport connection 116 (e.g., a TCP connection is still maintained for a corresponding connection class, while not dedicating a pooled server connection 110 to the network transport connection 116), a server connection GET command is implied. Again, the connection broker 108 responds accordingly by assigning a pooled server connection 110 to the process 105, and a single message serves both the purpose of implicitly requesting a server connection and the purpose of requesting a service, rather than using two round-trip communications with the server 106. In order to achieve this, the connection broker 108 associates a fixed connection class with the network connection state 118 associated with the network transport connection 116 to the broker 108 from the process 105. This fixed connection class for the network transport connection 116 is assigned when the process 105 submits the first GET request on that network transport connection 116. All subsequent requests that the broker 108 gets on that network transport connection 116 are assumed to belong to the fixed connection class. At this point, the connection broker 108 can simply interpret the presence of a message on the network transport connection 116 to mean that the process 105 needs to be assigned a pooled server connection 110 corresponding to the cached connection class in the associated network connection state 118. It can do this without having to peek into the incoming message and without having to parse an explicit GET request, which saves processing cycles in the connection broker 108 when compared to either a separate explicit GET request or even a piggybacked GET request.

Direct Conversation Between the Client and the Pooled Server Connection

In order to achieve the direct conversation from client 105 with the pooled server connection thread 114 for doing actual server operations, in one embodiment, the network transport connection 116 associated at the connection broker 108 is handed-off to the pooled server connection thread 114. Such a hand-off can be carried out using operating system support. In this manner, the connection broker 108 is not really involved in subsequent conversations between the client 105 and the pooled server connection thread 114. At this point, in some embodiments, the network transport connection descriptor exists at both the connection broker 108 as well as with the pooled server connection thread 114. In such cases, as long as the network transport connection is given to the pooled server connection thread 114, the connection broker 108 removes the corresponding descriptor from the list of network transport connection descriptors that it listens to for GET requests. Thus, all subsequent requests from client 105 are only handled by the pooled server connection's thread 114.

When the pooled server connection thread 114 receives a RELEASE message from the client, it hands-back the network transport descriptor to the connection broker 108, at which point, the connection broker 108 adds the descriptor back to the list of descriptors that it listens on for GET requests. Such a hand-back can be physically carried out using operating system support. However, in another embodiment, this act of handing back the network transport descriptor can also be optimized such that the hand-back can be made "virtual" wherein the pooled server thread of execution 114 supplies the connection broker 108 with some identifier; this identifier uniquely determines the network transport connection descriptor, which was previously removed by the connection broker 108 from the list of descriptors that it listens to for GET requests but for which the connection broker retained a copy. At this point, that network transport connection descriptor can be simply added by the connection broker 108 to the list of descriptors to which it listens for GET requests.

Piggybacked and One-Way Release Optimizations

Similarly to a piggybacked GET, a RELEASE can be piggybacked on the last call from the client. This can be accomplished by exposing a special parameter in the client side APIs that can specify whether a certain call to the server is the last call and will be immediately followed by a release operation. Finally, a RELEASE can also be converted into a one-way remote procedure call (RPC), where appropriate, so that the client process 105 does not have to wait for the RELEASE to be acknowledged before it can proceed.

Lazy Release Optimization

Additionally, the server side server connection pool can bind process 105 to a particular pooled server connection 110 even after a RELEASE has been issued by process 105, so that the cost of repeatedly binding the process 105 to the same pooled server connection 110 on the server can be avoided when there is little to no contention for the pooled server connection.

As an example, in the event that the number of pooled server connections 110 are more than the number of mid-tier processes 105 requesting pooled server connections 110, then following a RELEASE, a pooled server connection 110 is kept bound to a mid-tier process 105. Thus, the RELEASE is implemented lazily and is truly released only if there is any contention for pooled server connections 110.

Caching Benefits with Lazy Release Optimization

A pooled server connection 110 may maintain state of frequently used operations in a cache that resides in the pooled server connection state 112 and shared across all client processes 105 (using the same connection class) that the pooled server connection may bind to over its lifetime. Similarly, a client process 105 can maintain state of frequently used operations in a cache on the client process 105 for the lifetime of the client process 105 and shared across all pooled server connections 110 that the client process 105 may bind to over its lifetime. This measure allows for repeatedly issued operations to be executed faster both on the server and the client. All client processes working on behalf of a certain application typically tend to issue similar operations repeatedly. Such state can survive both in the pooled server and the client process across GET/RELEASE operations.

However, there is additional cached state that the client and pooled server connection could maintain that can survive as a long as a particular client process 105 is bound to a particular pooled server connection 110. Such state is often maintained by dedicated server connections for the lifetime of the server connection. In the context of pooled server connections, such state is destroyed on a RELEASE and reconstructed from scratch starting with a GET as requests are issued because it is unsafe to let such state persist across RELEASE operations. However, the Lazy Release optimization also enables caching of such state both in the mid-tier process 105 and in the server connection state 110 even after a RELEASE has been issued. E.g., in the context of databases, database clients often tend to keep cursor state for database cursors that they operate on. Such state becomes invalid after a RELEASE because the client may not get the same pooled-server connection. To guard against such a scenario, cached state tightly bound to a particular pooled server connection needs to be cleaned up on a RELEASE.

When the RELEASE is lazy, the APIs that issue server work could keep such additional state locally in process 105 and in pooled server connection 110 that have some tight coupling between the client 105 and the currently assigned pooled server connection 110. Only when the special response indicating that the pooled server connection 110 is reassigned is received by the process 105, does such state need to be cleaned up by the client process 105. Hence, in such a mode of operation where RELEASE is indeed lazy and more often than not, when the pooled server connection does not get reassigned, the cached state mentioned above in process 105 could help improve performance and providing a view of a nearly dedicated server connection. Any such additional state cached in pooled server connection 110 is reclaimed lazily when the association between the pooled server connection 110 and client process 105 is actually severed.

When applied to database servers, in the scenario in which a database client is kept bound to a pooled server connection, even after a RELEASE, in low contention environments, an additional optimization is to keep cursors open even after the RELEASE for it is likely that the process 105 will remain bound to the same pooled server connection 110. The cursors are destroyed only when the process 105 loses its binding to the pooled server connection 110 if the process 105 had RELEASED the pooled server connection 110 and in the meantime, some other process 105 was assigned the same pooled server connection 110, before the first process 105 issues the next GET operation. Such a reassignment is indicated by a special response sent back on an explicit or an implicit GET request.

A Method for Managing Connections to a Server

FIG. 2 is a flow diagram that illustrates a method for managing connections to a server, according to an embodiment of the invention. The method depicted in FIG. 2 is a computer and/or machine-implemented method in which a computer or machine performs the method, such as by one or more processors executing instructions. For example, the method may be performed on or by a computer system such as computer system 400 of FIG. 4.

At block 202, a first request for a server connection to a server is received at the server from a first client process associated with a first machine. For example, connection broker 108 of server 106 receives a server connection request from a process 105 of a first mid-tier machine 104. The server connection request may identify a particular server connection class with which the request is associated, which implicitly identifies a corresponding sub-pool of a pool of pooled server connections. For example, identifying a connection class in the server connection request identifies that the request came from a corresponding application 102 and a corresponding sub-pool of the pool of pooled server connections 110 from which a server connection should be assigned to the process 105 in response to the request. The server connection request may be an implicit GET, whereby the server connection broker 108 infers a server connection request from the first call from a process 105 which identifies a connection class, and which is stored away by the connection broker 108 in a network connection state data structure 118 associated with the network connection 116.

At block 204, in response to the first request the connection broker selects a server connection from a pool of server connections, wherein the server connection comprises a thread of execution and associated server connection state as described earlier. For example, connection broker 108 selects a pooled server connection 110 from a pool or sub-pool. In the scenario in which a connection class is identified in the server connection request, the server identifies a sub-pool of the pool of server connections that corresponds to the connection class, from which a server connection 110 is assigned to the process 105 in response to the server connection request. For example, the connection broker 108 of server 106 identifies a sub-pool of the pool of pooled server connections 110 that corresponds to the connection class and its associated application 102, from which a pooled server connection 110 is assigned to the process 105 in response to the server connection request. The connection broker 108 may identify a particular used pooled server connection 110 that was previously released back into the pool and that has an appropriate associated server connection state 112 that is requested by the requesting process 105 on behalf of the application 102, which may indicate a server connection with "clean" or initialized state. Alternatively, the connection broker 108 may identify an unused pooled server connection 110, or a pooled server connection 110 that was previously released back into the pool, and the pooled server connection thread 114 could modify the associated pooled server connection state 112 to a state that is requested by the requesting process 105 on behalf of the application 102, where modifying the state could entail executing one or more stored procedures.

At block 206, the selected server connection is associated with the first client process. For example, connection broker 108 of server 106 assigns the selected pooled server connection 110 to the requesting process 105, and maintains a data structure in which assignments of pooled server connection 110 to processes 105 are tracked, to reflect assignment of the particular pooled server connection 110 to the particular requesting process 105. According to an embodiment, connection broker 108 maintains a data structure to track the connection state 112 associated with each pooled server connection 110 that the connection broker 108 is managing. For example, the connection broker 108 uses this data structure to track whether or not the server connection state 112 of respective pooled server connections 110 are "dirty", i.e., in a state other than a "clean" or initialized state.

At block 208, after the first client process releases the pooled server connection back to the pool, a second server connection request for a connection to the server is received at the server from a second client process associated with a second machine, wherein the second machine is a different machine than the first machine from which the first server connection request was received at block 202. For example, connection broker 108 of server 106 receives a server connection request from a process 105 of a second mid-tier machine 104. As with the server connection request at block 202, this second server connection request may identify a particular connection class with which the request is associated, and/or the server connection request may be an implicit GET.

At block 210, in response to the second request the pooled server connection is associated with the second client process, i.e., the same pooled server connection as selected at block 204 is associated with the second client process. For example, connection broker 108 of server 106 assigns the selected pooled server connection 110 to the second requesting process 105, and maintains the data structure in which assignments of pooled server connections 110 are tracked, to reflect assignment of the particular pooled server connection 110 to the particular second requesting process 105.

Once the pooled server connection 110 is assigned to and associated with the requesting second client process at block 210, a request for one or more operations may be received at the server from the second client process via the network transport connection 116 originally established to the connection broker 108. For example, the pooled server connection 110 that was associated with the second client process 105 at block 210 directly receives the operation request, bypassing the connection broker 108 of server 106. Further, in response to the request for one or more operations, the server thread 114 corresponding to the pooled server connection 110 that was assigned to the second client process 105 performs the requested one or more operations and returns a result to the requesting second client process 105 via the network transport connection 116 to the server, e.g., a TCP connection between a mid-tier machine 104 and the server 106. To achieve this bypass for the request/response, the network transport connection 116 from the mid-tier process to the connection broker is handed-off to the pooled server connection for as long as the mid-tier process 105 is associated with the particular pooled server connection 110.

Also, when the pooled server connection 110 is RELEASED back to the server connection pool, at that point, the network transport connection 116 needs to be handed back to the connection broker 108. This handback can be physical or can be "virtual". In a physical handoff, the network transport connection descriptor is handed back from the pooled server connection 110 to the broker 108. In a virtual handback, the underlying network transport connection descriptor is not handed back again but a brief handshake from the pooled connection 110 to the broker 108 tells the broker 108 that the pooled connection 110 is no longer associated with the network transport connection 116 and that the broker should again listen to implicit/explicit GET requests on that network transport connection 116.

Based on the method depicted in FIG. 2, pooling of server connections 110 across mid-tier machines 104 is achieved. Some mid-tier machines 104 may be more active than others and, therefore, in such situations, clients that are not as active do not hold any server connections when idle. Furthermore, which mid-tier machines 104 are most active may change dynamically over time. By pooling resources at the server across mid-tiers, pooled server connections 110 are assigned across the mid-tier machines 104 dynamically.

A Method for Managing Server Connections to a Server

Figure 3:
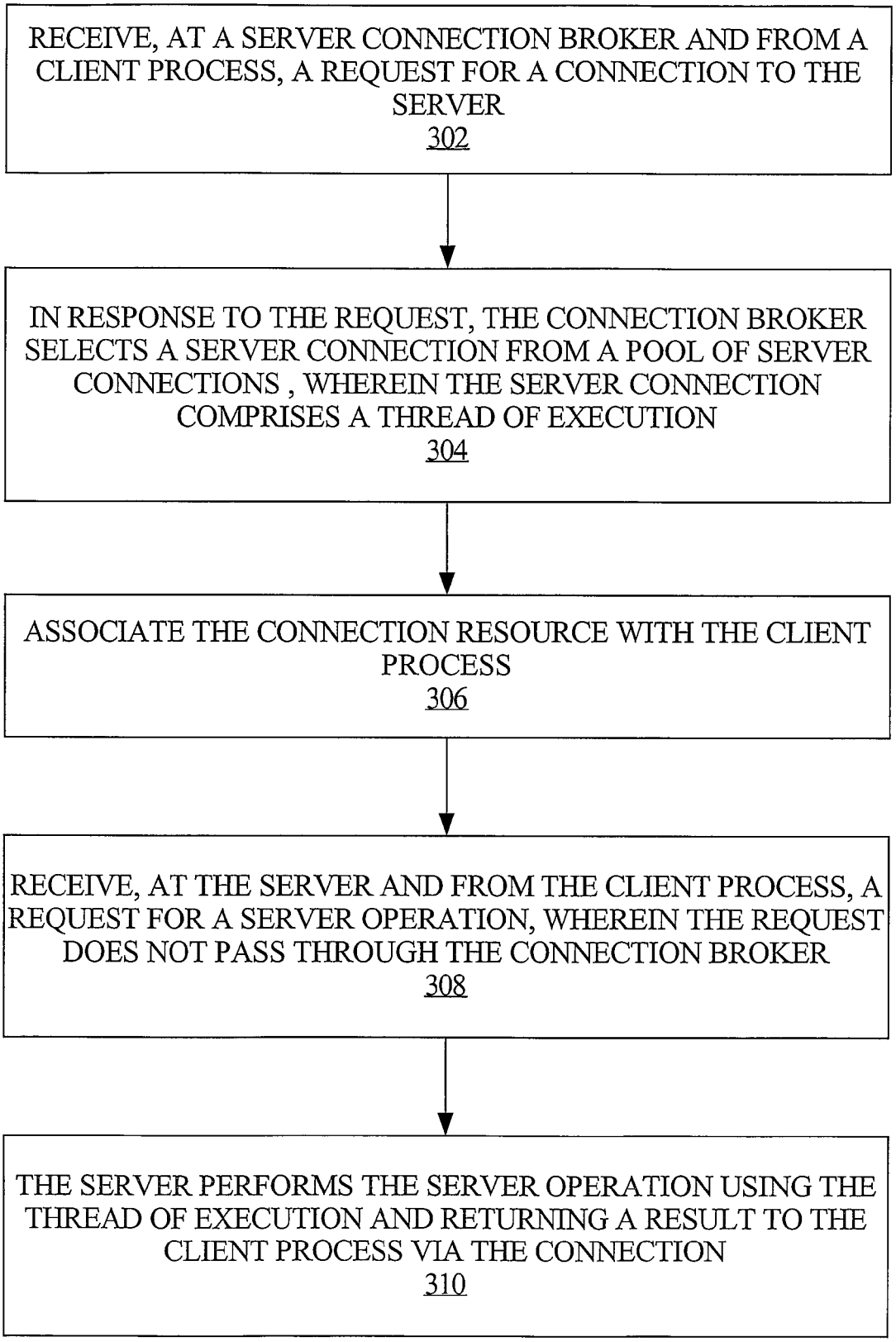
FIG. 3 is a flow diagram that illustrates a method for managing connections to a server, according to an embodiment of the invention.

FIG. 3 is a flow diagram that illustrates a method for managing connections to a server, according to an embodiment of the invention. The method depicted in FIG. 3 is a computer and/or machine-implemented method in which a computer or machine performs the method, such as by one or more processors executing instructions. For example, the method may be performed on or by a computer system such as computer system 400 of FIG. 4.

At block 302, a first request for a server connection to a server is received at the server connection broker from a client process. For example, connection broker 108 of server 106 receives a server connection request from a process 105 of a mid-tier machine 104, on behalf of an application 102. The server connection request may identify a particular connection class with which the request is associated, which implicitly identifies a corresponding sub-pool of a pool of pooled server connections 110. For example, identifying a connection class in the request identifies that the request came from a corresponding application 102 and a corresponding sub-pool of the pool of pooled server connections 110 from which a server connection should be assigned to the process 105 in response to the request, by the connection broker 108. The server connection request may be an implicit GET, whereby the connection broker 108 infers a server connection request from the first call from a process 105 which identifies a connection class.

At block 304, in response to the server connection request, the connection broker selects a server connection from a pool of server connections, wherein the server connection comprises a thread of execution and associated server connection state. For example, connection broker 108 selects a pooled server connection 110 from a pool or sub-pool. In the scenario in which a connection class is identified in the server connection request, the connection broker identifies a sub-pool of the pool of server connections that corresponds to the connection class, from which a server connection is assigned to the process 105 in response to the server connection request. For example, the connection broker 108 of server 106 identifies a sub-pool of the pool of pooled server connections 110 that corresponds to the connection class and its associated application 102, from which a pooled server connection 110 is assigned to the process 105, by the connection broker, in response to the server connection request. The connection broker 108 may identify a particular used pooled server connection 110 that was previously released back into the pool and that has an appropriate associated server connection state 112 that is requested by the requesting process 105 on behalf of the application 102, which may be a "clean" or initialized state. Alternatively, the connection broker 108 may identify an unused pooled server connection 110, or a pooled server connection 110 that was previously released back into the pool, and the pooled server connection thread 114 could modify the associated server connection state 112 to a state that is requested by the requesting process 105 on behalf of the application 102, where modifying the state could entail executing one or more stored procedures.

At block 306, the selected server connection is associated with the requesting client process. For example, connection broker 108 of server 106 assigns the selected pooled server connection 110 to the requesting process 105, and maintains a data structure in which assignments of pooled server connections 110 to processes 105 are tracked, to reflect assignment of the particular pooled server connection 110 to the particular requesting process 105. According to an embodiment, connection broker 108 maintains a data structure to track the server connection state 112 associated with each pooled server connection 110 that the connection broker 108 is managing. For example, the connection broker 108 uses this data structure to track whether or not the connection state 112 of respective pooled server connections 110 are "dirty", i.e., in a state other than a "clean" or initialized state.

At block 308, a request for one or more server operations is received at the server from the client process via the network transport connection 116 to the server, wherein the request for one or more server operations does not pass through the connection broker. For example, the pooled server connection 110 that was associated with the client process 105 at block 306 directly receives a server operation request, bypassing the connection broker 108 of server 106.

At block 310, in response to the request for one or more server operations, the server thread 114 corresponding to the pooled server connection 110 that was assigned to the client process 105 performs the requested one or more server operations, and returns a result directly to the requesting client process 105 via the network transport connection 116 to the server, e.g., a TCP connection between a mid-tier machine 104 and the server. As with the request for one or more server operations, the result returned to the requesting client process 105 bypasses the connection broker 108, thereby minimizing the number of hops between the client/mid-tier and the back-end server tier. This bypass for the request/response, the network transport connection 116 from the mid-tier process 105 to the connection broker 108 is handed-off to the pooled server connection for as long as the mid-tier process 105 is associated with the particular pooled server connection 110. Any such hops means extra processing (e.g. additional inter process communication calls) and extra latencies in communication, both of which are performance issues.

Based on the method depicted in FIG. 3, pooling of resources across client processes is achieved. For a non-limiting example, PHP is a very popular scripting language that is used in almost a third of the web domains. However, PHP applications typically run in single threaded, process oriented web server environments. Thus, the former lack of connection pooling in PHP-based systems is a major concern with PHP users. However, this concern is overcome using embodiments of the invention, thereby enabling more scalable PHP systems. Furthermore, no proxy server process is involved when in a steady state. Stated otherwise, once the server connection has been assigned to the requesting process, all communications between a connection GET and a connection RELEASE (and possibly even after a RELEASE unless there is contention) happen directly with the thread of execution associated with the server connection. In this manner, an extra hop for the data transfers is avoided.

Hardware Overview

Figure 4:
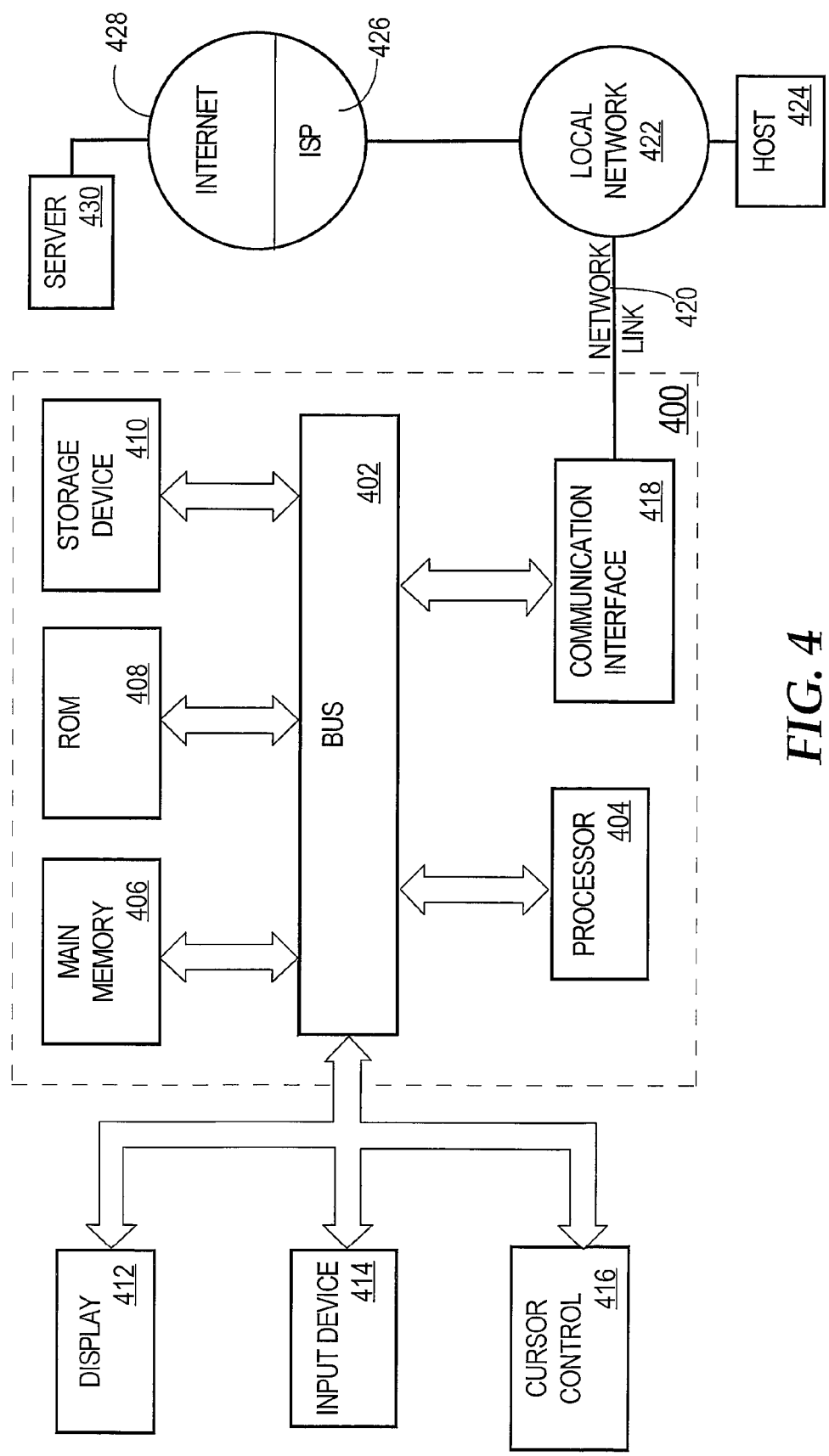
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

receiving, at a server-side connection broker from a client process, a request for a connection to a server, said request for a connection being sent via a network transport connection between the client process and the server-side connection broker;

in response to said request, said server-side connection broker selecting a server connection from a pool of server connections, wherein said server connection comprises a thread of execution;

handing-off said network transport connection between the client process and the server-side connection broker to the server connection to (1) establish said server connection to be an end point for said network transport connection and to (2) bypass said server-side connection broker within said network transport connection while said server connection is the end point of said network transport connection;

receiving, at said server connection and from said client process via said network transport connection, a request for one or more server operations; and said server connection performing said one or more server operations and returning a corresponding result to said client process via said network transport connection; and after said result is returned, handing-back said network transport connection to said server-side connection broker to establish the server-side connection broker to be the end point for said network transport connection and cause said server-side connection broker to listen for further requests via said network transport connection.

2. The method of claim 1, wherein said pool is logically partitioned into a plurality of sub-pools, and wherein each sub-pool is associated with a respective connection class.

3. The method of claim 2, wherein said request for a server connection is a first request for a server connection and is received via a first network transport connection from a first client process associated with a particular application, said method further comprising:

receiving, at said server-side connection broker via a second network transport connection from a second client process associated with said particular application, a second request for a server connection, wherein said second request identifies a particular connection class;

in response to said second request and based on said particular connection class:
  said server-side connection broker selecting a server connection from a particular sub-pool associated with said particular connection class; and
  handing-off said second network transport connection to the selected server connection.

4. The method of claim 2, wherein said request for a server connection is a first request for a server connection and is received via a first network transport connection from a first client process associated with a particular application, said method further comprising:

associating with said server connection a particular connection class that corresponds to said particular application;

after said first client process releases said server connection back to said pool, receiving, at said server-side connection broker via a second network transport connection and from a second client process associated with said particular application, a second request for a server connection, wherein said second request identifies said particular connection class; and in response to said second request and based on said particular connection class, handing-off said second network transport connection to the server connection.

5. The method of claim 1, wherein said request for a connection is a request for a server operation and not an explicit request for a server connection.

6. The method of claim 1, wherein said server connection is associated with a corresponding server connection state data structure with which server connection state is maintained for said server connection.

7. The method of claim 6, wherein said request for a server connection is a first request for a server connection and is received via a first network transport connection from a first client process associated with a particular application, and wherein after said first client process releases said server connection back to said pool, said server connection state data structure represents a first server connection state of said server connection, said method further comprising:

receiving, at said server-side connection broker via a second network transport connection and from a second client process associated with said particular application, a second request for a server connection; and in response to said second request, handing-off said second network transport connection to the server connection, wherein said server connection state data structure represents said first server connection state of said server connection.

8. The method of claim 6, wherein said request for a server connection is a first request for a server connection and is received via a first network transport connection from a first client process associated with a particular application, and wherein after said first client process releases said server connection back to said pool, said server connection state data structure represents a first server connection state of said server connection, said method further comprising:

receiving, at said server-side connection broker via a second network transport connection and from a second client process associated with said particular application, a second request for a server connection, wherein said second request comprises a request for a server connection having an initialization server connection state;

in response to said second request, said server connection modifying said server connection state data structure to represent an initialization server connection state; and handing-off said second network transport connection to the server connection, wherein said server connection is associated with said server connection state data structure that represents said initialization server connection state and said server connection still comprises said thread of execution.

9. The method of claim 6, wherein said request for a server connection is a first request for a server connection and is received via a first network transport connection from a first client process associated with a particular application, and wherein after said first client process releases said server connection back to said pool, said server connection state data structure represents a first server connection state of said server connection, said method further comprising:

receiving, at said server-side connection broker via a second network transport connection and from a second client process associated with said particular application, a second request for a connection, wherein said second request comprises a request for a server connection having a second server connection state that is different from said first server connection state;

in response to said second request:
  said server connection modifying said server connection state data structure to represent said second server connection state by executing a stored machine-executable procedure associated with said particular application; and
  handing-off said second network transport connection to the server connection.

10. The method of claim 1,
via said network transport connection, said server-side connection broker receiving a certain message from said client process for a server operation; and wherein a second message is piggybacked to said certain message, said second message requesting a server connection for said client process.

11. The method of claim 1, further comprising:
said server-side connection broker associating a network connection state with said network transport connection;
said server connection handing-off said network transport connection to said server-side connection broker;
said server-side connection broker receiving via said network transport connection a certain request from said client process for a server operation; and said server-side connection broker selecting a certain server connection for said client process based on said network connection state.

12. The method of claim 11,
wherein said pool is logically partitioned into a plurality of sub-pools; and
wherein the the method further includes selecting, based on said network connection state, a sub-pool from which to select a server connection to associate with the said client process.

13. The method of claim 1, further including:
via said network transport connection, said server-side connection broker receiving a certain message from said client process for a server operation; and
wherein a second message is piggybacked to said certain message, said second message requesting to release a server connection for said client process.

14. The method of claim 1, further including in response to a period of time elapsing without receiving a request for a certain operation from said client, reclaiming said server connection for said client process.

15. The method of claim 1, further including receiving from said client process a certain message via a one way remote procedure call, said message requesting to release said server connection.

16. The method of claim 1, further including:
receiving a release message from said client process to release said server connection,
in response to receiving said release message, retaining an association between said client process and said server connection.

17. The method of claim 16, wherein the step of retaining includes retaining cached state that corresponds to a tight coupling between said client process and said server connection.

18. The method of claim 16, further including:
reclaiming said server connection that was retained; and
subsequent to reclaiming, receiving a certain message from said client process to perform a server operation; and
in response to receiving said certain message, returning another message indicating that said server connection is not associated with said client process.

19. The method of claim 1, wherein the server-side connection broker runs on the server.

20. A non-transitory computer-readable storage medium storing instructions which, when executed by one or more processors, cause said one or more processors to perform steps comprising:
receiving, at a server-side connection broker from a client process, a request for a connection to a server, said request for a connection being sent via a network transport connection between the client process and the server-side connection broker;
in response to said request,
said server-side connection broker selecting a server connection from a pool of server connections, wherein said server connection comprises a thread of execution;
handing-off said network transport connection between the client process and the server-side connection broker to the server connection to (1) establish said server connection to be an end point for said network transport connection and to (2) bypass said server-side connection broker within said network transport connection while said server connection is the end point of said network transport connection;
receiving, at said server connection and from said client process via said network transport connection, a request for one or more server operations; and
said server connection performing said one or more server operations and returning a corresponding result to said client process via said network transport connection; and
after said result is returned, handing-back said network transport connection to said server-side connection broker to establish the server-side connection broker to be the end point for said network transport connection and cause said server-side connection broker to listen for further requests via said network transport connection.

21. The non-transitory medium of claim 20, wherein said pool is logically partitioned into a plurality of sub-pools, and wherein each sub-pool is associated with a respective connection class.

22. The non-transitory medium of claim 21, wherein said request for a server connection is a first request for a server connection and is received via a first network transport connection from a first client process associated with a particular application, whether the instructions which, when executed by one or more processors, cause said one or more processors to further perform:
receiving, at said server-side connection broker via a second network transport connection from a second client process associated with said particular application, a second request for a server connection, wherein said second request identifies a particular connection class;
in response to said second request and based on said particular connection class:
said server-side connection broker selecting a server connection from a particular sub-pool associated with said particular connection class; and
handing-off said second network transport connection to the selected server connection.

23. The non-transitory medium of claim 21, wherein said request for a server connection is a first request for a server connection and is received via a first network transport connection from a first client process associated with a particular application, whether the instructions which, when executed by one or more processors, cause said one or more processors to further perform:
associating with said server connection a particular connection class that corresponds to said particular application;
after said first client process releases said server connection back to said pool, receiving, at said server-side connection broker via a second network transport connection and from a second client process associated with said particular application, a second request for a server connection, wherein said second request identifies said particular connection class; and
in response to said second request and based on said particular connection class, handing-off said second network transport connection to the server connection.

24. The non-transitory medium of claim 20, wherein said request for a connection is request for a server operation and not an explicit request for a server connection.

25. The non-transitory medium of claim 20, wherein said server connection is associated with a corresponding server connection state data structure with which server connection state is maintained for said server connection.

26. The non-transitory medium of claim 20, whether the instructions which, when executed by one or more processors, cause said one or more processors to further perform:

said server-side connection broker associating a network connection state with said network transport connection;

said server connection handing-off said network transport connection to said server-side connection broker;

said server-side connection broker receiving via said network transport connection a certain request from said client process for a server operation; and said server-side connection broker selecting a certain server connection for said client process based on said network connection state.

27. The non-transitory medium of claim 20, wherein the server-side connection broker runs on the server.

* * * * *

UNITED STATES PATENT AND TRADEMARK OFFICE
CERTIFICATE OF CORRECTION

PATENT NO. : 8,713,186 B2
APPLICATION NO. : 12/047278
DATED : April 29, 2014
INVENTOR(S) : Chidambaran et al.

It is certified that error appears in the above-identified patent and that said Letters Patent is hereby corrected as shown below:

In the Specification

Column 1, lines 64-65, delete "multi threaded." and insert -- multi-threaded. --, therefor.

In the Claims

Column 23, line 7, Claim 12, delete "the the" and insert -- the --, therefor.

Signed and Sealed this
Seventh Day of October, 2014

Michelle K. Lee
*Deputy Director of the United States Patent and Trademark Office*